United States Patent
Smith II

(10) Patent No.: US 6,779,966 B2
(45) Date of Patent: Aug. 24, 2004

(54) HORIZONTAL WINDMILL

(76) Inventor: William Patterson Smith II, 395 N. Shantel Dr., Tucson, AZ (US) 85745

( * ) Notice: Subject to any disclaimer, the term of this patent is extended or adjusted under 35 U.S.C. 154(b) by 0 days.

(21) Appl. No.: 10/060,593

(22) Filed: Jan. 30, 2002

(65) Prior Publication Data

US 2003/0143072 A1 Jul. 31, 2003

(51) Int. Cl.$^7$ .................................. F03D 3/06
(52) U.S. Cl. ..................... 415/4.4; 415/907; 416/140
(58) Field of Search .................... 416/119, 140; 415/4.1, 4.2, 4.4, 907

(56) References Cited

U.S. PATENT DOCUMENTS 3,743,848 A * 7/1973 Strickland .................. 290/55
4,415,312 A * 11/1983 Brenneman ................ 416/119

* cited by examiner

Primary Examiner—Edward K. Look
Assistant Examiner—Dwayne J. White
(74) Attorney, Agent, or Firm—Thrasher Associates

(57) ABSTRACT

The invention is a system, device and method that captures wind energy and converts it into mechanical or electrical energy. In a system embodiment, the system transfers wind power to rotational energy. The system includes a wind capture means that uses wind to generate a mechanical force, an energy coupling means for transferring the mechanical force to a horizontally mountable wheel having a shaft coupled thereto, and an energy transfer system that couples the mechanical force from the shaft to a machine. In a device embodiment, a wheel capable of receiving wind power is provided. The wheel includes an airfoil support having a center portion, a stop location, and an airfoil location, and an airfoil is coupled to the airfoil support at the airfoil location. A method of driving the wheel uses a mounted airfoil to capture wind energy in an airflow, where the airfoil is mounted to a horizontally mountable wheel.

17 Claims, 2 Drawing Sheets

HORIZONTAL WINDMILL

TECHNICAL FIELD

Generally, the invention relates to windmills, and more particularly, the invention relates to systems, methods and devices for transferring wind energy into a mechanical motion.

STATEMENT OF A PROBLEM ADDRESSED BY THIS INVENTION

Windmills have long been used to capture wind energy. Most persons are familiar with the windmills of Spain and the Netherlands. These windmills use spokes that are coupled to a central axel. The spokes typically have some type of wind-catching means attached to them. Accordingly, the wind catching means catch some wind, which causes the spokes to revolve and rotate the central vertical shaft. The rotation of the central axel is then captured rotational energy which can be put to use to grind grain, generate electricity, or to raise an object, for example.

More recently, windmills have been rediscovered as a new and effective way of generating electricity. These new windmills are often quite large and often appear in large numbers of groupings in power fields. However, windmills, old and new, have disadvantages. For example, old windmills are generally inefficient, while new windmills are quite large and difficult to place. Furthermore, very few windmills are capable of operating when the wind speeds are low. Accordingly, to overcome these and other disadvantages associated with existing methods of converting wind energy into mechanical energy, it would be advantageous to provide a windmill that is capable of capturing wind energy at low wind speeds, and that is easily placed. The invention provides such a device, system, and method

SELECTED OVERVIEW OF SELECTED EMBODIMENTS

The invention provides technical advantages as a system, device and method for capturing wind energy, and than converting the wind energy into mechanical or electrical energy. In a system embodiment, the system includes a wind capture means that uses wind to generate a mechanical force, an energy coupling means for transferring the mechanical force to a horizontally mountable wheel having a shaft coupled thereto, and an energy transfer system that couples the mechanical force from the shaft to a machine. In a device embodiment, a wheel includes an airfoil support having a center portion, a stop location, and an airfoil location, and an airfoil is coupled to the airfoil support at the airfoil location. A method of driving the wheel uses a mounted airfoil to capture wind energy in an airflow, where the airfoil is mounted to a horizontally mountable wheel.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Brief Introduction

Figure 1:
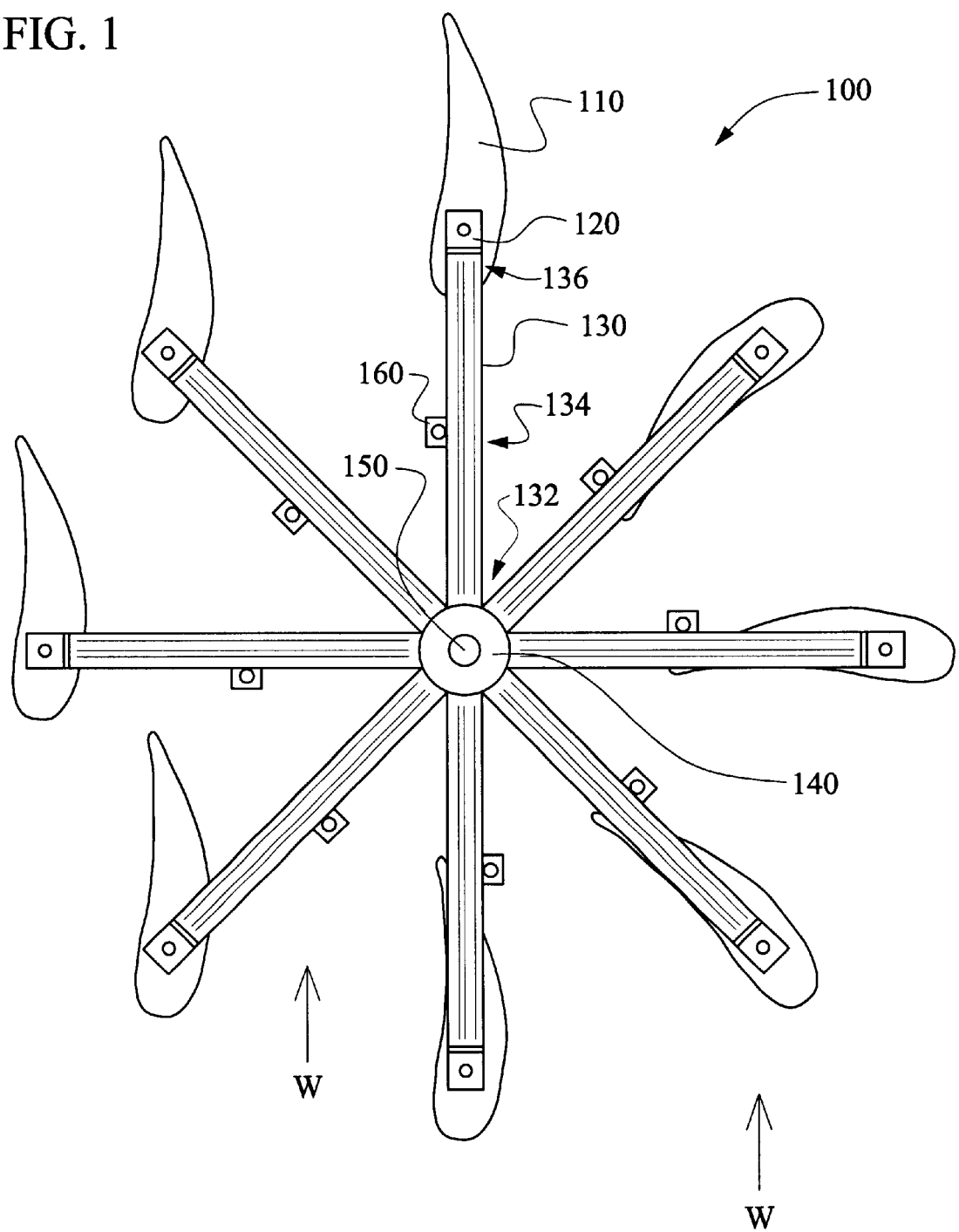
FIG. 1 provides one embodiment of a windmill according to the invention.

The invention captures wind energy and converts it into mechanical or electrical energy via the use of a horizontally mounted wheel. By using a horizontally mounted wheel, space limitations on windmill placement are reduced. In addition, multiple wheels can be attached to a single vertical shaft to increase the force of rotation on the vertical shaft. Furthermore, by using an airfoil to catch wind energy in a new way disclosed herein, the windmill of the invention can operate at about half the windspeed of known windmills.

As a system, the invention uses a wind capture means that uses wind to generate a mechanical force, an energy coupling means for transferring the mechanical force to a horizontally mountable wheel having a shaft coupled thereto, and an energy transfer system that couples the mechanical force from the shaft to a machine. As a device, the invention includes an airfoil support having a center portion, a stop location, and an airfoil location, and an airfoil is coupled to the airfoil support at the airfoil location. As a method, the invention uses a mounted airfoil to capture wind energy in an airflow, where the airfoil is mounted to a horizontally mountable wheel. Of course, upon reading the following, many additional embodiments are readily apparent to those of ordinary skill in the art.

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or, even a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise which are readily apparent to those of ordinary skill in the art. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for-functioning-"or " step for-functioning-" in the Claims section.

Description of the Figures

The invention may be embodied as a system that transfers wind energy into rotational energy (a wind/energy transfer system). The wind/energy transfer system includes a wind capture means, such as an airfoil. A force in wind is capable of being transformed into a mechanical force, as is recognized by anyone witnessing a conventional windmill. Accordingly, the wind capture means catches wind force. An energy coupling means, such as a bolt, transfers the force caught by the wind capture means to an airfoil support, such as a horizontally mountable wheel, which typically has a shaft coupled thereto at approximately the center of the airfoil support. An energy transfer system, such as a bolt, couples the mechanical force from the shaft to a machine, such as an electric generator. An optional stop system a system capable of preventing an overdrive condition may be coupled to the airfoil support.

An examination of a figure of one embodiment of the invention may help one gain an appreciation of the features of the invention. Accordingly, FIG. 1 provides one embodiment of a windmill 100 according to the invention (viewing the windmill 100 from the top). The windmill 100 uses a wind capture means illustrated here as an airfoil 110 to capture wind in motion, which inherently has a force associated with it. A preferred direction of the wind is illustrated by the direction of arrows that originate in a "W". It should be understood that although an airfoil is a preferred embodiment of the invention, many embodiments of wind capture means are usable with the invention, such as parachute-shaped capturing means, or traditional windmill arms. Thus, the invention is not limited to a specific airfoil embodiment.

The wind capture means 110 is coupled to an airfoil support 130 through an energy coupling means 120. Here, the airfoil support 130 is illustrated as a spoke structure (note that a tread structure is not required, or shown). However, the embodiment shown in FIG. 1 is not limited to the specific spoke structure shown. For example, the airfoil support 130 could be embodied as a wheel, disk or other structure that is able to couple wind energy to a vertical shaft 150 (which may be located preferably below, or in one embodiment, above, the windmill 100). In addition, the energy coupling means 120 may be embodied as a bolt, nut-and-bolt washer combination, or any other mechanical coupling means that is able of rotatably coupling the wind capture means to an airfoil support 130. In one embodiment, the airfoil support 130 has a center portion 132, a stop location 134, and a wind capturing means location 136. Typically, in operation, a vertical shaft support 140 is coupled to the airfoil support 130 at approximately the center portion 132.

Figure 2:
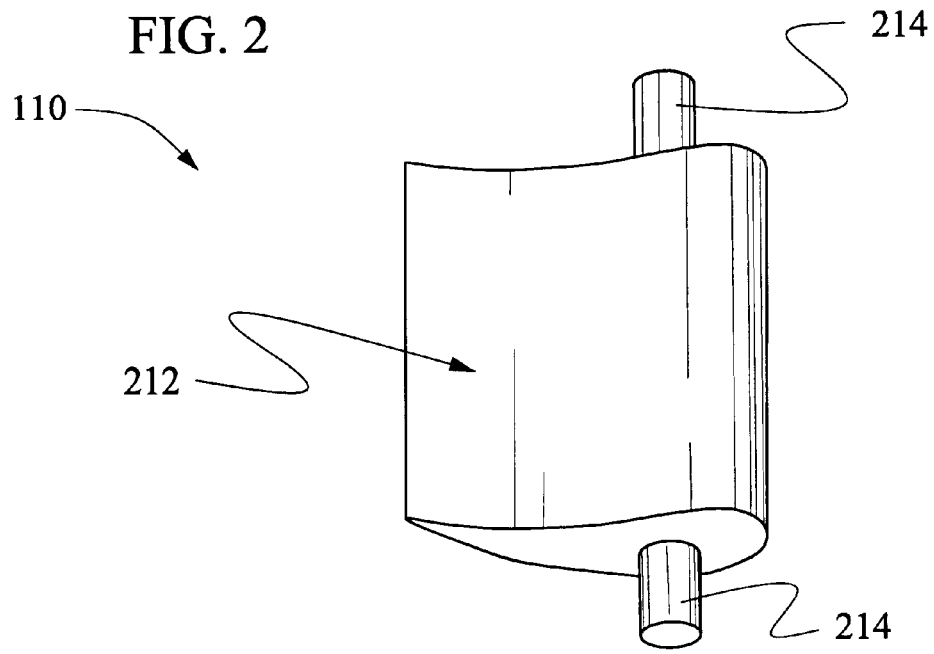
FIG. 2 illustrates an embodiment of an airfoil.

FIG. 2 illustrates an embodiment of an airfoil 110. The airfoil is preferably coupled to the airfoil support 130 at the airfoil location 136. The airfoil 110 preferably has an airfoil shape as is known in the aerospace arts. In addition, the airfoil 110 has a generally concave portion that is shaped to capture wind with a parachute when the airfoil 110 is disposed against a stop in the windmill 100. This is apparent when examining FIG. 1. Returning to FIG. 2, the airfoil 110, in one embodiment, has dowels 214 coupled thereto. The dowels 214 are designed to fit either directly into an airfoil support means 130, or into an energy coupling means 120 that is coupled to the airfoil support means 130.

Figure 3:
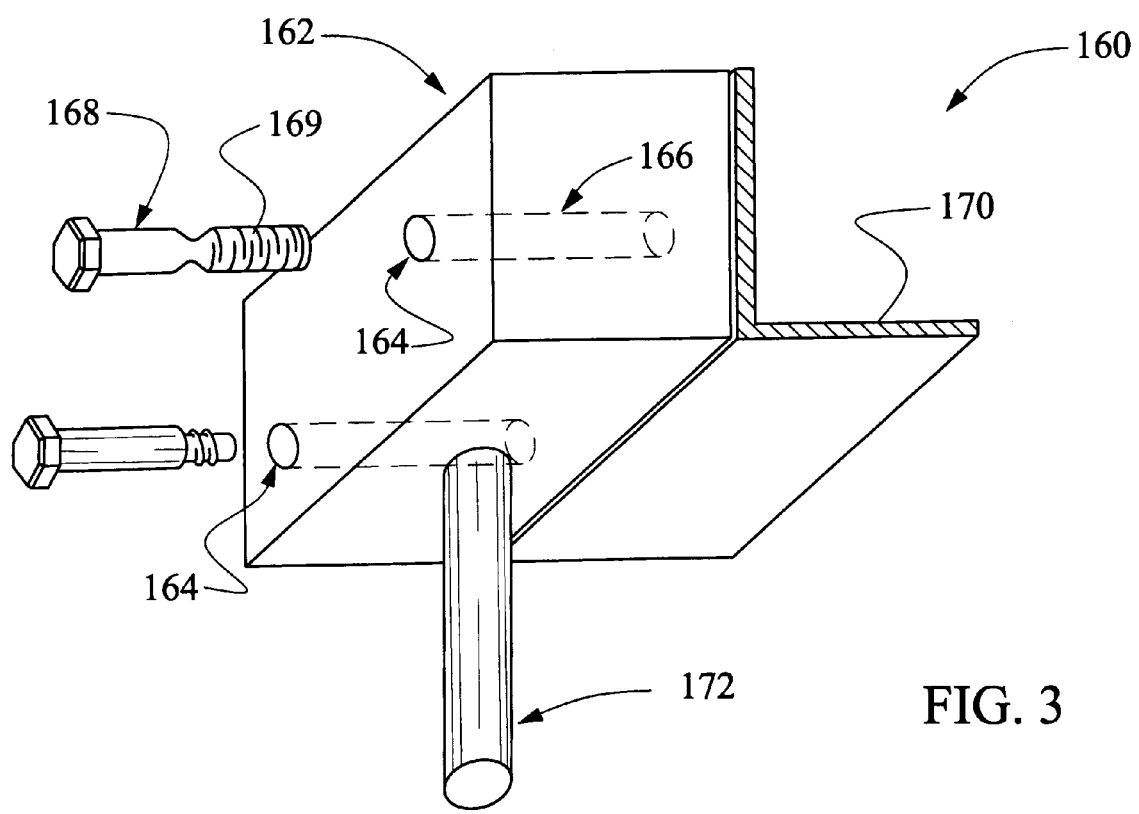
FIG. 3 illustrates a stop.

A stop 160, preferably mounted below the airfoil support 130, enables the airfoil 110 to take advantage of the concave potion 212. FIG. 3 illustrates a stop 160. The stop 160 includes a block 162. The block has a plurality of holes 164 formed by shafts 166. Bolts 168 have metal-penetratable tips 169 that drill into the shaft and into an L-shaped lip 170. The tips 169 do not penetrate through the lip 170, but do penetrate deeply enough into the lip 170 to secure the lip 170 to the block 162. A dowel 172 is coupled to the block 162 (or, alternatively, formed with the block 162).

The dowel 172 couples the stop 160 to the airfoil support 130 at approximately the stop point 134. Preferably, the stop 160 is positioned to catch a wind catching means 110 in such a way as to transfer power from the wind catching means 110 to the stop 160. Thus, the stop 162 is positioned less then the length of the airfoil from the wind capturing means location 136. In addition, it should be recognized that as the stop approaches the wind capturing means location 136, the torque generated increases. In one embodiment, the stop is enabled to overcome an overdrive condition—this can be achieved by, for example, designing the dowel 172 to shear off when a predetermined force is detected.

Referring again to FIG. 1, a vertical shaft 150 is coupled to the vertical shaft support 140, preferably below the airfoil support 130, and, in one embodiment, the vertical shaft 150 is a height-adjustable vertical shaft. Although not illustrated, in one embodiment, a plurality of airfoil supports are coupled to the vertical shaft. In operation, a machine or an electric generator may be coupled to the vertical shaft 150.

One may gain a better appreciation for the invention by exploring a method of using the invention. Accordingly, a method of driving a windmill according to the invention uses an airfoil that is attached to a horizontally mounted airfoil support to capture energy from the wind. Energy is captured when wind blows into the concave portion of an airfoil, and due to the Bernoulli effect of the airfoil. The captured energy is then transferred to a vertical shaft to provide mechanical energy to an electric generator or a machine. Optionally, an overdrive condition may be detected, and the rotational velocity of the airfoil support may be controllably adjusted.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A windmill capable of receiving wind power and transferring wind power into mechanical energy, the windmill comprising: a horizontally mountable airfoil support having a wind capturing means location; an airfoil coupled to the airfoil support at the wind capturing means location; a stop coupled to the airfoil support at approximately a stop point wherein the stop is enabled to overcome an overdrive condition.

2. The windmill of claim 1 wherein the airfoil support is generally disk-shaped.

3. The windmill of claim 1 further comprising a vertical shaft support coupled to the airfoil support at approximately a center portion.

4. The windmill of claim 3 wherein the airfoil support comprises a plurality of spokes coupled to the vertical shaft support.

5. The windmill of claim 3 further comprising a vertical shaft coupled to the vertical shaft support.

6. The windmill of claim 5 further comprising a machine coupled to the vertical shaft.

7. The windmill of claim 5 further comprising an electric generator coupled to the vertical shaft.

8. The windmill of claim 5, wherein a plurality of wheels are coupled to the vertical shaft.

9. The windmill of claim 5, wherein the vertical shaft is a height-adjustable vertical shaft.

10. The windmill of claim 5 wherein the airfoil support is mounted on the vertical shaft in an approximately horizontal position.

11. The windmill of claim 1 wherein the stop is positioned less then the length of the wind capturing means from the airfoil location.

12. A method of driving a windmill, comprising: using an airfoil that is attached to a horizontally mounted airfoil support to capture energy from the wind and a stop coupled to the airfoil support at approximately a stop point wherein the stop is enabled to overcome an overdrive condition.

13. The method of claim 12 further comprising detecting an overdrive condition and controllably adjusting a rotational velocity of the airfoil support.

14. The method of claim 12 further comprising transferring the energy to a vertical shaft.

15. The method of claim 14 further comprising coupling the energy to an electric generator.

16. A system that transfers wind energy into rotational energy, comprising: a wind capturing means; an energy coupling means for transferring a mechanical force to a horizontally mountable airfoil support having a vertical shaft coupled thereto; an energy transfer system that couples the mechanical force from the shaft to a device; and a stop system coupled to the airfoil support wherein the stop system is enabled to overcome an overdrive condition.

17. The system of claim 16 wherein the device is an electric generator.

* * * * *